April 15, 1958     E. SCHLENKER     2,831,006
HYDROLYSIS OF FATS AND OILS
Filed March 28, 1955
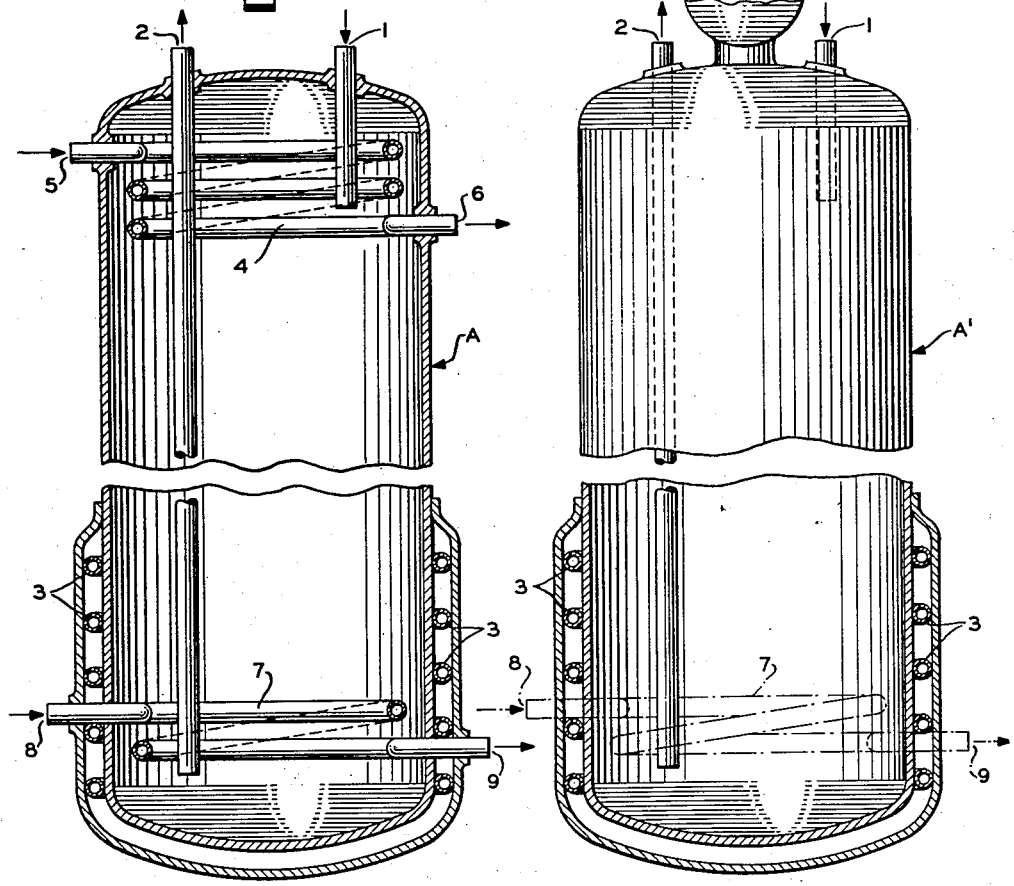
INVENTOR.
ERNEST SCHLENKER
BY *Emanuel R. Posnack*
ATTORNEY

United States Patent Office 2,831,006
Patented Apr. 15, 1958

2,831,006

HYDROLYSIS OF FATS AND OILS

Ernest Schlenker, St. Barnabe, Marseille, France

Application March 28, 1955, Serial No. 497,297

11 Claims. (Cl. 260—415)

This invention relates to the hydrolysis, i. e., the splitting, of fats or fat-containing materials; and in particular is directed to such hydrolysis with or without catalysts at temperatures above 225° C. and under pressures of at least 25 atmospheres.

The instant invention provides a novel method of achieving practically complete hydrolysis in a relatively short interval of time. It further provides the possibility of utilizing relatively small quantities of water in effectuating the hydrolysis with or without catalysts so as thereby to obtain relatively concentrated solutions of glycerine. Additionally, it also allows the operator to achieve economical use of the cubic capacity available in the pressure vessels employed in carrying out the hydrolysis so that the space required for a given quantity of fat can be substantially smaller than would otherwise be the case, by reason of the fact that the hydrolysis is carried out with a lesser quantity of water than is usually employed in hydrolysis.

Hydrolysis of fats is a reversible reaction. As the concentration of the glycerine in the solution developed increases during the course of the process, the reverse reaction, i. e., esterification between the liberated fatty acids and the glycerine becomes a factor of increasing importance. At the end of the operation, an equilibrium between these two reactions will be reached; and the extent of the hydrolysis, i. e., the amount of free fatty acids present as compared with the amount of the total fatty acids contained in the starting stock, depends on the quantity of water employed, rather than on other factors, and therefore on the final concentration of the glycerine solution developed.

Another factor which is of importance in relation to the instant invention, is the solubility, under certain circumstances of water and aqueous glycerine solutions, in fats and fatty acids. This solubility of the aqueous phase in the fatty phase is negligible at relatively low temperatures but becomes very sensible at temperatures starting at about 220° C., and can result in a single homogeneous phase at 260° C. if the operation is begun with 100 parts of fat and 25 parts of water. It is a customary, common practice in the splitting of fats with or without catalysts to begin the operation with such a proportion of water that, at the end, a mean concentration of from 10 percent to 15 percent of glycerine in the aqueous solution is attained. Accordingly, the water is used in an amount of from 60 percent to 100 percent calculated on the mass of the fat depending upon the species and the glycerine content thereof. The extent of the splitting under these conditions rarely exceeds 90 percent to 92 percent. If hydrolysis to a fuller extent is required, the quantity of water used initially must be increased, or after removing the glycerine solution developed, the operation repeated with a quantity of newly added water. This latter procedure is frequently used; and a great number of variations thereof are known, as for example, the re-use of the dilute glycerine solution developed in the second stage as a starting reactant for the first stage. The repetition of three or four such stages in a method such as described presents great advantages from the standpoint of achieving the highest possible extent of the hydrolysis. If such repetitions are made at each stage with small quantities of water, i. e., if the total amount of water computed for the total hydrolysis is subdivided into several portions, successively used, the above mentioned advantage of high glycerine concentrations and saving of autoclave volume (cubage), or better utilization of a given autoclave volume, would be reached. However, a process such as described brings in its train a significant increase in time required to accomplish the splitting, especially if difficulty is encountered in separating mixtures into aqueous and non-aqueous phases. An essential condition for the realization of complete hydrolysis by such processes, is the practically complete removal of the glycerine phase developed in preceding stages, since otherwise, the water added for carrying out a subsequent stage becomes loaded from the very beginning of the stage with the unremoved glycerine contained in the fat to be split. Thus, the final concentration of the glycerine in the second and subsequent states is increased and the extent of the splitting is correspondingly lower. Such a complete removal of the aqueous phase remains relatively simple as long as relatively low pressures and temperatures are involved. It is sufficient to allow the contents of the pressure vessel to set for some time; and then to proceed to separate the deposited aqueous layer. An equally well known modification of that method consists in emptying the contents of the pressure vessel into an appropriate storage vessel or tank, allowing the stored reaction mixture to settle, removing the separated fatty phase therefrom and sending it anew into the pressure vessel. If, as is the case in modern plants, the splitting is carried out at pressures of 25 and 50 atmospheres, this removal of the aqueous solution becomes complicated due to the above mentioned solubility of glycerine solutions in the fat phase at temperatures corresponding to those pressures. In order to achieve a satisfactory separation of the glycerine solution under such elevated temperature, it is necessary to wait until the temperature falls to such a point where the solubility is negligible. Instead of allowing the reaction mixture to remain in the autoclave, as mentioned above, during the time required for the settling to take place, it is now understandably preferable to follow the second course mentioned above, namely, to discharge the autoclave and thus effectuate the automatic release of the pressure. However, with the high temperatures involved in carrying out the splitting at the high pressures mentioned above, there arises the problem of how to avoid the loss of calories, a loss which is very important when there is a repeated release of pressure. The usual precautionary measures to avoid such loss of heat energy consists in recuperating the calories contained in the stock by means of appropriate heat exchangers. It is obvious that such heat exchanging, if repeated several times during a single splitting operation connected with the frequent removal of the aqueous phase, is costly and time-consuming. Moreover, heat exchangers are expensive pieces of apparatus, the cost being proportional to the heat exchange surface available for the purpose. Since heat exchange is slow, large and therefore costly surfaces must be provided.

In the common practice of splitting fats at high pressure in autoclaves, it is customary therefore, to carry out the operation in one or at most two stages; and to renounce in the interest of economy, the advantages offered by a several-times repeated separation of the phases.

In accordance with the instant invention, the pressure vessel is provided with cooling devices, as for example, coils made of acid-proof metal through which a coolant flows. Preferably the coolant is fat, or fatty acids or water destined for use in consecutive splitting operations which are thereby pre-heated. It is an essential feature of this invention that such cooling devices are positioned in such locations connected with the pressure vessels where a rapid heat exchange can be taken for granted, that is preferably in the vapor space of the pressure vessel. The rapidity of the heat exchanged between two fluids separated by metallic walls depends upon the heat transfer coefficient (HTC), expressed in calories per hour per square meter per degree of medium difference of temperature between the two fluids. This HTC is very small if the two fluids are liquids at rest. It is greater if one or both are moving; and it is comparatively even greater if one of the fluids is a condensible vapor. The latter is precisely the case if the cooling device, for example iron coils in which relatively cold fat circulates, is placed in the upper part of the pressure vessel where it is surrounded by vapors composed of water and volatile fatty acids. If, on the contrary, the same coils are placed in the bottom of the pressure vessel or at any rate in some place where they are in contact with the liquid part of the stock, there would be a liquid at rest at one side and a moving liquid on the other side of the wall, and the heat exchange would be considerably slower. It could, however, be accelerated though by no means to the extent attained with the cooling coils positioned in the vapor space, if a stirring device is operated in the pressure vessel. In such a case, the liquids on both sides of the walls of the cooling device are in movement and therefore the HTC is better than it would be with one of the fluids at rest. Although the execution of the process of this invention is not limited to a single type of apparatus, two examples of suitable apparatus are shown in Figs. 1 and 2 which are schematic representations of the essential parts of such apparatus.

In Fig. 1, the upper and lower part of an autoclave A are indicated. The feed stock and the other materials employed in the reaction enter through 1 and they are discharged, by the pressure prevailing in the vessel, through tube 2. The contents of the pressure vessel are heated by coils 3 or other adequate or suitable means. In the upper part of the vessel, there are disposed several coils of metallic tubes for the circulation of the cooling medium which enters at 5 and leaves at 6. Another cooling coil 7 may be placed in the bottom, the coolant entering at 8 and exiting at 9.

In Fig. 2 the cooling device is calandria 21 disposed within a small pressure vessel 22 that communicates with the vapor space of the autoclave A'. The inner surfaces of the tubes are contacted by the vapors. The cooling medium surrounds the tubes, entering at 23 and exiting as at 24.

In carrying out the process of this invention, the splitting may be effectuated as follows:

Fat and water are fed into the autoclave in such quantity that during the whole operation, the liquid introduced or produced during the operation, does not completely fill the vessel but allows for a vapor space thereabove. The contents of the autoclave are heated for about thirty minutes at from 250°–260° C. Then the heating is interrupted; and the cooling medium is sent through the coil 4, and if the coil 7 is present, likewise through said coil 7, the latter stream serving less for the rapid cooling of the stock than to arrest the vigorous spontaneous ebullition which results from the sudden condensation of the vapors with the consequent decrease of the pressure in the vapor space.

As result of the contact of the vapors with the cold surface of coil 4, they are condensed with resultant development of new vapors due to latent heat contained in the reaction mass. Such loss of calories brings about a rapid cooling down of the liquid mass. When the temperature falls to about 225°, at which temperature the solubility of the aqueous phase in the fat phase becomes negligible, the movement of the coolant through the coils is stopped, and the contents of the pressure vessel allowed to stratify and settle. The separated aqueous phase is removed from the vessel by means of pumps or by utilizing the pressure prevailing in the autoclave. Then a new quantity of water, or of a diluted solution of the sweet water produced in a preceding operation, is introduced into the pressure vessel, as by means of a pressure pump, and the process, as described above, repeated. That operation may be repeated as desired.

It is possible, furthermore, to carry out the operation by countercurrent movement, as for example, by operating with two or more autoclaves disposed in such arrangement that raw fat which has served as a coolant in one autoclave constitutes the feed stock for a second autoclave that is ready for the beginning of a new operation.

The time required to effectuate the cooling, as will be apparent, depends upon the cooling area of the cooling device. For example, when using a cylindrical autoclave having a capacity of 8000 liters (about 1300 mm. in diameter and 5000 mm. in height) it may be charged with 5000 kilograms of fat and 1000 kilograms of water. When the temperature of the reaction mass is 255° C. and it is reduced to 230° C. (a drop of 25° C.), the heat transferred amounts to 100,000 calories, calculated on the basis of the specific heats of fat and water as 0.6 and 1.0, respectively. Thus, the calculation is as follows:

$$5000 \times 25 \times 0.6 + 1000 \times 25 \times 1 = 100{,}000 \text{ calories}$$

The HTC in such case amounts to at least 2000 calories per hour per degree of difference of temperature. The difference is approximately 120° C. if the coolant enters at 80° C. and 160° C. when it emerges from the cooling device. Consequently if the cooling device has a cooling surface area of from 2.0 to 3.0 square meters, the above described heat transfer can be accomplished within a time interval of from 13 down to 9 minutes.

It will be apparent that this invention makes it possible for the first time to utilize in carrying out the total hydrolysis of fats, the well-known fact that with increasing temperatures and pressures the equilibrium can be attained more rapidly, and even almost instantaneously (and therefore without danger of damage to the fat) if reaction temperatures of 230° C. or higher are used. Since, as has been mentioned, the reaction is reversible, the complete hydrolysis is attained only by the removal of the aqueous phase containing the developed glycerine, and splitting the residual state unhydrolyzed fat with newly added water or a weak glycerine solution. The marked advantage of the instant process resides, however, in the fact that the losses of time and calories are eliminated by the cooling technique described.

It is to be noted that the caloric unit recited above as "calorie" means the "large calroie."

The following are illustrative examples of the splitting of fats carried out in accordance with the instant invention.

*Example 1*

Into an autoclave having a diameter of 1100 mm. and a cylindrical height of 8000 mm. (made of acid-resistant steel) and equipped with a stirring device, inlet and outlet valves, piping, and manometer, etc., there are introduced 3500 kg. of coconut oil and 700 kg. of water. In the upper part of the autoclave, but out of contact with the liquid, is a cooling coil having a cooling surface of three square meters, as is shown in Fig. 1 of the drawing. The mass is heated by means of high pressure steam passing through a heating coil positioned in the interior of the autoclave.

The mass of coconut oil and water is heated to 260° C. and held at that temperature for fifteen minutes while being continuously stirred. The heating is then discontinued and water is passed through the cooling coil during the course of about ten minutes, as a result of which the liquid mass is cooled to 110°–120° C. The stirring is discontinued and at the end of about ten minutes the liquid stratifies into a fatty layer and an aqueous layer. The aqueous glycerine-containing layer is transferred under pressure into another vessel provided with a pressure release valve, cooling device, etc. where this aqueous glycerin solution can be stocked. Without taking into account water loss due to evaporation during the transfer of the aqueous layer there are obtained in this way about 620 kg. of a solution containing 29 percent glycerol and which can be concentrated by conventional procedures. The partially split fat remaining in the autoclave contains about 60 percent free fatty acids as well as considerable quantities of partial glycerides. Such content of partial glycerides is manifest when it is observed that the quantity of glycerol obtained as above described is less than that calculated from the amount of splitting that has taken place.

To the mass remaining in the autoclave there are then added 1800 kg. of water by means of a pressure pump. The temperature is raised to 240°–245° C. and maintained at that level for a period of about fifty minutes while the mass is being agitated. On cooling and stratification there is obtained an aqueous layer (when evaporation losses during discharging are avoided) of 2100 kg. of a glycerol solution containing 12 percent glycerol. The residue fatty acids in the autoclave contain 93 percent free fatty acids.

Example 2

3500 kg. of coconut oil and 700 kg. of water are processed during a first period of fifteen minutes in accordance with the procedure of the first step as described in Example 1 to effectuate hydrolysis, cooling and stratification; and the aqueous layer is removed. After such removal 900 kg. of water are introduced into the autoclave by means of a pressure pump and the fatty residue and newly added water are heated under agitation for a period of about fifteen minutes at 260° C., following which the mass is cooled to 220° C., by passing a coolant through the cooling coil, allowed to stratify, and the aqueous layer is removed. The aqueous layer constitutes 1000 kg. of a solution containing 18 percent of glycerol. The acid number of the fatty layer remaining in the autoclave is about 214.

1300 kg. of fresh water are introduced into the autoclave, the mass is heated and held at a temperature of 240°–245° for about forty minutes. On cooling, as described, followed by stratification the aqueous layer discharged from the autoclave constitutes 1650 kg. of a solution containing 6 percent of glycerol. The residual fatty layer contains 98 percent of free fatty acids.

It will be understood that the foregoing description of the invention is merely illustrative of the principles thereof. Accordingly, the appended claims are to be construed as defining the invention within the full spirit and scope thereof.

I claim:
1. In the process of splitting fats and oils by the hydrolytic action of water at temperatures of at least 225° C. and under elevated pressure in a pressure vessel, wherein the pressure vessel is incompletely filled with the reacting materials thereby providing a vapor space above the liquid, the step of rapidly cooling the reaction mass by heat exchange cooling of the vapor in the said vapor space.
2. Process in accordance with claim 1 wherein the heat exchange is carried out by the flow of a coolant through said vapor space.
3. Process in accordance with claim 1 wherein the ebullition of the reaction mass being cooled by the aforesaid heat exchange is arrested by the flow of a coolant through said reaction mass.
4. Process in accordance with claim 1 wherein the splitting of the fat is accelerated by catalysis.
5. In the process of splitting fats and oils by the hydrolytic action of water at temperatures of at least 225° C. and under elevated pressure in a pressure vessel wherein the pressure vessel is incompletely filled with reacting materials thereby providing a vapor space above the liquid, the steps of rapidly cooling the reaction mass by heat exchange cooling of the vapor in said vapor space to a temperature at which the aqueous phase and the fat phase become immiscible, allowing said phases to stratify, removing the aqueous phase, adding water to the fat phase, and splitting the residual unsplit fat contained in the aforesaid fat phase by subjecting the mass to a temperature of at least 225° C. and under elevated pressure.
6. Process in accordance with claim 5 wherein the heat exchange is carried out by the flow of a coolant through said vapor space.
7. Process in accordance with claim 6 wherein the ebullition of the reaction mass being cooled by the aforesaid heat exchange is arrested by the flow of a coolant through said reaction mass.
8. Process in accordance with claim 5 wherein the splitting of the fat is accelerated by catalysis.
9. Process in accordance with claim 6 wherein the splitting of the fat is accelerated by catalysis.
10. Process in accordance with claim 7 wherein the splitting of the fat is accelerated by catalysis.
11. Process in accordance with claim 5 wherein the water added to the fat phase remaining after removal of the separated aqueous phase, is in the form of an aqueous solution of glycerine.

References Cited in the file of this patent
UNITED STATES PATENTS
2,221,799    Ittner _____ Nov. 19, 1940
FOREIGN PATENTS
666,785    Great Britain _____ Feb. 20, 1952